US011412426B2

(12) United States Patent
Lotfallah et al.

(10) Patent No.: US 11,412,426 B2
(45) Date of Patent: Aug. 9, 2022

(54) ACCESS CHECK OPTIMIZATION FOR HANDOVER FROM WIRELESS LOCAL AREA NETWORK (WLAN) AND OTHER INTER RADIO ACCESS TECHNOLOGY (IRAT)

(71) Applicant: QUALCOMM Incorporated, San Diego, CA (US)

(72) Inventors: Osama Lotfallah, San Diego, CA (US); Kuo-Chun Lee, San Diego, CA (US); Zhong Ren, San Diego, CA (US); Abhishek Bhatnagar, San Diego, CA (US); Arvind Vardarajan Santhanam, San Diego, CA (US); Zhiyuan Lu, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/990,579

(22) Filed: Aug. 11, 2020

(65) Prior Publication Data
US 2021/0051540 A1    Feb. 18, 2021

Related U.S. Application Data

(60) Provisional application No. 62/887,487, filed on Aug. 15, 2019.

(51) Int. Cl.
*H04W 4/00*   (2018.01)
*H04W 36/00*  (2009.01)
(Continued)

(52) U.S. Cl.
CPC ..... *H04W 36/0077* (2013.01); *H04L 65/1016* (2013.01); *H04W 4/14* (2013.01);
(Continued)

(58) Field of Classification Search
CPC ......... H04W 36/0077; H04W 36/0079; H04W 36/0083; H04W 36/00835;
(Continued)

(56) References Cited

U.S. PATENT DOCUMENTS

| 2009/0175239 A1* | 7/2009 | Grinshpun | H04W 36/28 370/331 |
| 2017/0201939 A1* | 7/2017 | Lee | H04W 28/0231 |

FOREIGN PATENT DOCUMENTS

WO    WO-2016018012 A1    2/2016

OTHER PUBLICATIONS

"Generation Partnership Project; Technical Specification Group Core Network and Terminal; Non-Access-Stratum (NAS) protocol for 5G System (5GS); Stage 3 (Release 16)", 3GPP Standard, Technical Specification, 3GPP TS 24.501, 3rd Generation Partnership Project (3GPP), Mobile Competence Centre, 650, Route Des Lucioles, F-06921 Sophia-Antipolis Cedex, France, vol. CT WG1, No. V.16.1.0, Jun. 14, 2019 (Jun. 14, 2019), pp 1-541, XP051754142, [retrieved on Jun. 14, 2019], 4.5 Unified access control, p. 47-p. 63.
(Continued)

*Primary Examiner* — Huy C Ho
(74) *Attorney, Agent, or Firm* — Qualcomm/Norton Rose Fulbright US LLP

(57) ABSTRACT

This disclosure provides systems, methods, and apparatus, including computer programs encoded on computer storage media, for wireless communication by a user equipment (UE). In one aspect, the UE is configured to generate a handover request related to a wireless communication session between the UE and a wireless local area network (WLAN) device, and establish, independent of an access check, a radio resource control (RRC) connection with a base station. In another aspect, the UE is configured to perform an access check based on a bias value, and establish
(Continued)

an RRC connection with a base station based on a result of the access check. The access check performed based on a communication indicator related to a wireless communication session between the UE and a WLAN device.

30 Claims, 8 Drawing Sheets

(51) Int. Cl.
  *H04W 36/08*   (2009.01)
  *H04W 76/27*   (2018.01)
  *H04W 48/08*   (2009.01)
  *H04W 4/14*   (2009.01)
  *H04L 65/1016*   (2022.01)
  *H04W 84/12*   (2009.01)

(52) U.S. Cl.
  CPC ........... *H04W 36/08* (2013.01); *H04W 48/08* (2013.01); *H04W 76/27* (2018.02); *H04W 84/12* (2013.01)

(58) Field of Classification Search
  CPC ....... H04W 36/00837; H04W 36/0085; H04W 36/0088; H04W 36/0094; H04W 36/02; H04W 36/023; H04W 36/026; H04W 36/005; H04W 36/0055; H04W 36/0058; H04W 36/0061; H04W 36/0066; H04W 76/27; H04W 65/1016; H04W 4/14; H04W 36/08; H04W 48/08; H04W 84/12
  USPC .......................................................... 370/331
  See application file for complete search history.

(56) References Cited

OTHER PUBLICATIONS

International Search Report and Written Opinion—PCT/US2020/045901—ISAEPO—dated Nov. 20, 2020.
Qualcomm Incorporated: "UAC Check for Services Started in WLAN and Being Transferred to 3GPP Access", 3GPP Draft, 3GPP TSG-CT WG1 Meeting #119, C1-194391 UAC HO from WLAN V1, 3rd Generation Partnership Project (3GPP), Mobile Competence Centre, 650, Route Des Lucioles, F-06921 Sophia-Antipolis Cedex, France, vol. CT WG1, No. Wroclaw (Poland), Aug. 26, 2019-Aug. 30, 2019, Aug. 19, 2019 (Aug. 19, 2019), XP051763036, 5 Pages, Retrieved from the Internet: URL: http://www.3gpp.org/ftp/tsg_ct/WG1_mm-cc-sm__ex-CN1/TSGC1_119_Wroclaw/Docs/C1-194391.zip, [retrieved on Aug. 19, 2019], the whole document.

* cited by examiner

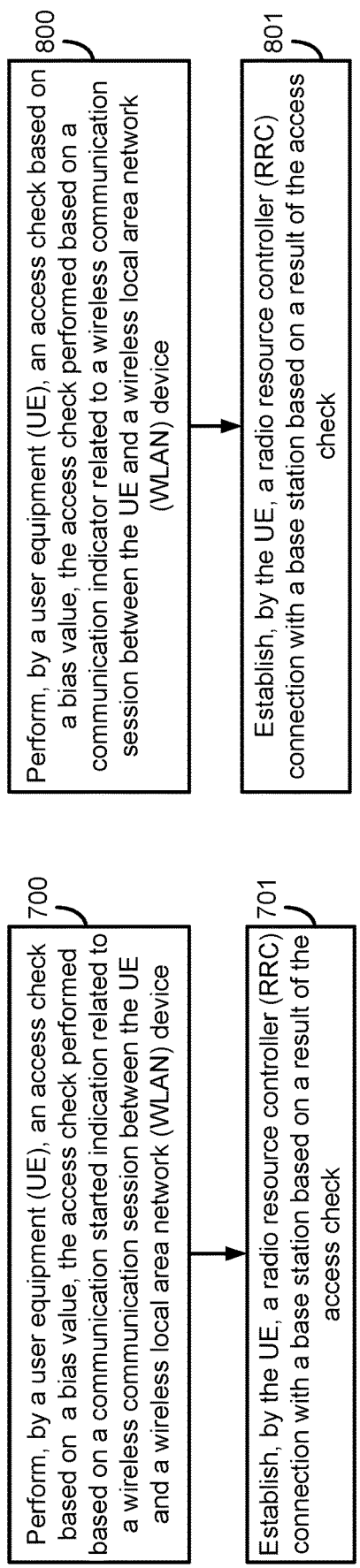
FIG. 7
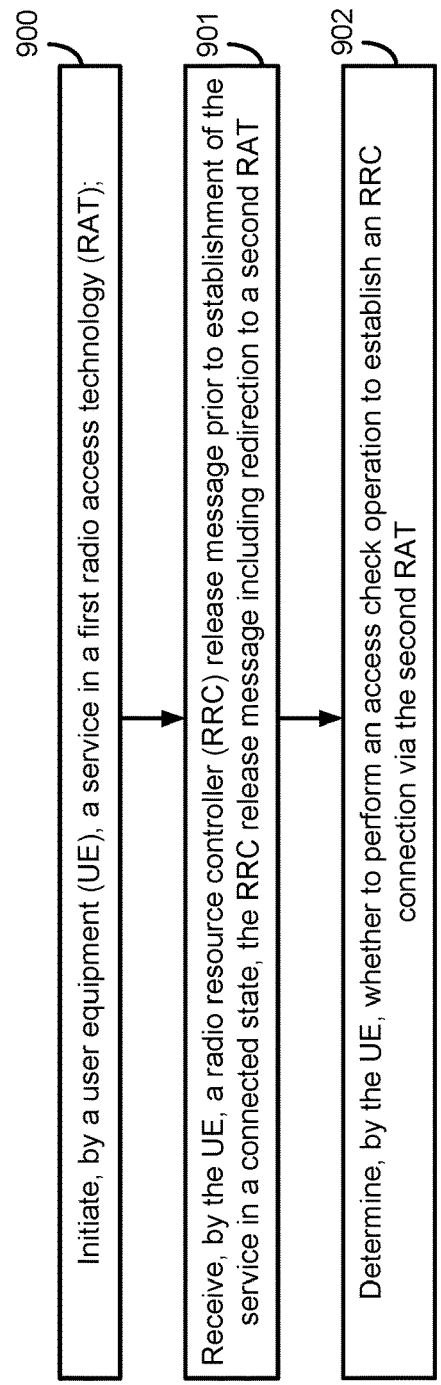
FIG. 8
FIG. 9

ACCESS CHECK OPTIMIZATION FOR HANDOVER FROM WIRELESS LOCAL AREA NETWORK (WLAN) AND OTHER INTER RADIO ACCESS TECHNOLOGY (IRAT)

CROSS-REFERENCE TO RELATED APPLICATIONS

This application claims the benefit of U.S. Provisional Patent Application No. 62/887,487, entitled, "ACCESS CHECK OPTIMIZATION FOR HANDOVER FROM WIRELESS LOCAL AREA NETWORK (WLAN) AND OTHER INTER RADIO ACCESS TECHNOLOGY (IRAT)," filed on Aug. 15, 2019, which is expressly incorporated by reference herein in its entirety.

TECHNICAL FIELD

Aspects of the present disclosure relate generally to wireless communication systems, and more particularly, to systems for performing a handover operation.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink (DL) and uplink (UL). The DL (or forward link) refers to the communication link from the base station to the UE, and the UL (or reverse link) refers to the communication link from the UE to the base station. A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but also to advance and enhance the user experience with mobile communications.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication. The method includes generating, by a user equipment (UE), a handover request related to a wireless communication session between the UE and a wireless local area network (WLAN) device. The method further includes establishing, by the UE and independent of an access check, a radio resource control (RRC) connection with a base station.

In some implementations, the method can include setting, by the modem of the UE, an RRC establishment cause as an exempted service. Additionally, or alternatively, the method can include transmitting, by the modem of the UE, a service request that includes the RRC establishment cause to the base station.

In some implementations, the method can include skipping, by the modem of the UE, performance of the access check operation based on receiving the handover request. Additionally, or alternatively, the method can include performing, by the UE, a handover operation to transfer the wireless communication session from the WLAN device to the base station.

Another innovative aspect of the subject matter described in this disclosure can be implemented in an apparatus configured for wireless communication. The apparatus includes at least one processor and a memory coupled to the at least one processor. The at least one processor is configured to generate, by a UE, a handover request related to a wireless communication session between the UE and a WLAN device. The at least one processor is further configured to initiate, by the UE and independent of an access check, establishment of an RRC connection with a base station.

Another innovative aspect of the subject matter described in this disclosure can be implemented in an apparatus configured for wireless communication. The apparatus includes means for generating, by a UE, a handover request related to a wireless communication session between the UE and a WLAN device. The apparatus further includes means for establishing, by the UE and independent of an access check, an RRC connection with a base station.

Another innovative aspect of the subject matter described in this disclosure can be implemented in a non-transitory computer-readable medium storing instructions that, when executed by a processor, cause the processor to perform operations including generating, by a UE, a handover request related to a wireless communication session between the UE and a WLAN device. The operations further include initiating, by the UE and independent of an access check, establishment of an RRC connection with a base station.

Another innovative aspect of the subject matter described in this disclosure can be implemented in an apparatus configured for wireless communication. The apparatus includes a processing system configured to generate a handover request related to a wireless communication session between the apparatus and a WLAN. The apparatus further includes an interface configured to establish, independent of an access check, an RRC connection with a base station.

Another innovative aspect of the subject matter described in this disclosure can be implemented in a method of wireless communication. The method includes performing, by a UE, an access check based on a bias value. The access check is performed based on a communication indicator related to a wireless communication session between the UE and a WLAN device. The method further includes establishing, by the UE, an RRC connection with a base station based on a result of the access check.

In some implementations, the method can include modifying, by the modem of the UE, a received barring factor based on the bias value, where the access check is performed using the modified barring factor. Additionally, or alternatively, the method can include performing, by the UE, a handover operation to transfer the wireless communication session from the WLAN device to the base station.

In some implementations, the method can include determining, by the UE, whether a received barring factor indicates 100 percent blocked. In some such implementations, if the barring factor is determined to indicate 100 percent blocked, the bias value is set such that the modified barring factor is the same as the barring factor and the RRC connection with the base station may not be established.

Another innovative aspect of the subject matter described in this disclosure can be implemented in an apparatus configured for wireless communication. The apparatus includes at least one processor and a memory coupled to the at least one processor. The at least one processor is configured to perform, by a UE, an access check based on a bias value. The access check is performed based on a communication indicator related to a wireless communication session between the UE and a WLAN device. The at least one processor is further configured to initiate, by the UE, establishment of an RRC connection with a base station based on a result of the access check.

Another innovative aspect of the subject matter described in this disclosure can be implemented in an apparatus configured for wireless communication. The apparatus includes means for performing, by a UE, an access check based on a bias value. The access check is performed based on a communication indicator related to a wireless communication session between the UE and a WLAN device. The apparatus further includes means for establishing, by the UE, an RRC connection with a base station based on a result of the access check.

Another innovative aspect of the subject matter described in this disclosure can be implemented in a non-transitory computer-readable medium storing instructions that, when executed by a processor, cause the processor to perform operations including performing, by a UE, an access check based on a bias value. The access check is performed based on a communication indicator related to a wireless communication session between the UE and a WLAN device. The operations further include initiating, by the UE, establishment of an RRC connection with a base station based on a result of the access check.

Another innovative aspect of the subject matter described in this disclosure can be implemented in an apparatus configured for wireless communication. The apparatus includes a processing system configured to perform an access check based on a bias value. The access check is performed based on a communication indicator related to a wireless communication session between the UE and a WLAN device. The apparatus further includes an interface configured to establish an RRC connection with a base station based on a result of the access check.

Another innovative aspect of the subject matter described in this disclosure can be implemented in a method of wireless communication. The method includes initiating, by a UE, a service in a first radio access technology (RAT). The method further includes receiving, by the UE, an RRC release message prior to establishment of the service in a connected state. The RRC release message including redirection to a second RAT. The method also includes determining, by the UE, whether to perform an access check operation to establish an RRC connection via the second RAT.

In some implementations, the method can include establishing, by the UE and independent of an access check, the RRC connection with the second RAT. In other implementations, the method can include performing, by the UE, the access check based on a bias value, the access check performed based on the RRC release message. Additionally, or alternatively, the method can include establishing, by the UE, the RRC connection with the second RAT based on a result of the access check.

Another innovative aspect of the subject matter described in this disclosure can be implemented in an apparatus configured for wireless communication. The apparatus includes at least one processor and a memory coupled to the at least one processor. The at least one processor is configured to initiate, by a UE, a service in a first RAT. The at least one processor is further configured to receive, by the UE, an RRC release message prior to establishment of the service. The at least one processor is also configured to determine, by the UE, whether to perform an access check operation to establish an RRC connection via the second RAT.

Another innovative aspect of the subject matter described in this disclosure can be implemented in an apparatus configured for wireless communication. The apparatus includes means for initiating, by a UE, a service in a first RAT. The apparatus further includes means for receiving, by the UE, an RRC release message prior to establishment of the service. The apparatus also includes determining, by the UE, whether to perform an access check operation to establish an RRC connection via the second RAT.

Another innovative aspect of the subject matter described in this disclosure can be implemented in a non-transitory computer-readable medium storing instructions that, when executed by a processor, cause the processor to perform operations including initiating, by a UE, a service in a first RAT. The operations further include receiving, by the UE, an RRC release message prior to establishment of the service. The operations also include determining, by the UE, whether to perform an access check operation to establish an RRC connection via the second RAT.

Another innovative aspect of the subject matter described in this disclosure can be implemented in an apparatus configured for wireless communication. The apparatus includes a processing system configured to initiate, by a UE, a service in a first RAT. The processing system is further configured to determine, by the UE, whether to perform an access check operation to establish an RRC connection via a second RAT based on an RRC release message identified prior to establishment of the service in a connected state, the RRC release message including redirection to a second RAT. The apparatus further includes a first interface configured to obtain the RRC release message.

Details of one or more implementations of the subject matter described in this disclosure are set forth in the accompanying drawings and the description below. Other

BRIEF DESCRIPTION OF THE DRAWINGS

FIG. 7 is a block diagram illustrating example blocks executed by a UE.

FIG. 8 is a block diagram illustrating example blocks executed by a UE.

FIG. 9 is a block diagram illustrating example blocks executed by a UE.

Like reference numbers and designations in the various drawings indicate like elements.

DETAILED DESCRIPTION

Figure 1:
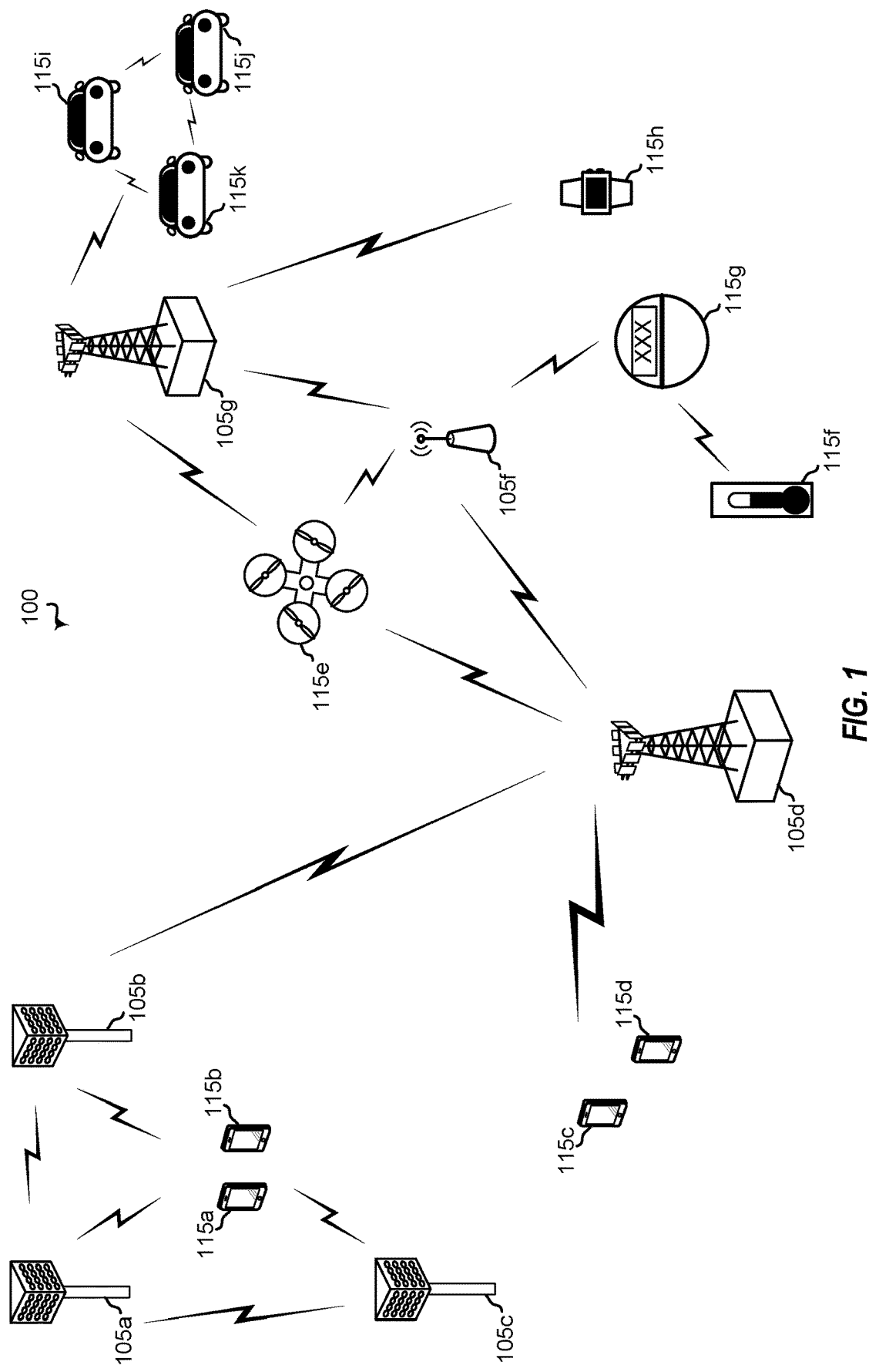
FIG. 1 is a block diagram illustrating details of an example wireless communication system.

The following description is directed to certain implementations for the purposes of describing the innovative aspects of this disclosure. However, a person having ordinary skill in the art will readily recognize that the teachings herein can be applied in a multitude of different ways.

In some situations, such as when no cellular service is available, a radio is unavailable, a cellular signal is too weak, or a radio resource control (RRC) connection is access barred, a UE may start a communication with a cellular network via a wireless local area network (WLAN). During the communication session, such as a voice call, a video call, or a short message system (SMS) session, if a sufficient cellular connection to the same cellular network becomes available, the UE may initiate a handover operation from the WLAN to the cellular network. However, an initial access attempt, such as an RRC connection establishment request, over a cellular network is subject to an access check which may limit the UE's ability to complete the handover operation. For example, during the access check, the UE may generate a random number between zero and one ([0, 1]) and, if the random number is greater than or equal to a barring factor provided by the cellular network, the UE is prohibited from establishing the RRC connection. Accordingly, when the UE determines to perform the handover operation, such as when a quality of service of the WLAN is low, the UE may not be able to complete a handover operation to the cellular network having a high quality of service. Thus, the UE maintains the communication via the WLAN having the low quality of service which can negatively impact a quality of experience of the communication session.

This disclosure provides systems, methods, and apparatus, including computer programs encoded on computer storage media, for wireless communication by a UE. For example, the present disclosure describes systems for performing a handover operation. To illustrate, a UE may establish a wireless communication session, such as a mobile originated (MO) session or a mobile terminated (MT) session, with a WLAN device and determine to handover the wireless communication session to a base station. For example, the wireless communication session may be started over the WLAN. To illustrate, the UE may start the communication session with a cellular network via the WLAN and may initiate a handover operation from the WLAN to the same cellular network. In some implementations, the UE may bypass performance of the access check operation based on (or in response to) a modem of the UE receiving a communication indicator, such as a handover request. In implementations where performance of the access check operation is bypassed, the UE may set an RRC establishment cause to indicate an exempted service, such as "mt-access" (also referred to or designated as "mt-acc" or "MT_acc"). In some implementations, the UE may perform the access check operation. For example, the access check operation may be performed based on a bias value. The access check operation may be performed based on (or in response to) the modem receiving the communication indicator, such as a mobile originating (MO)-multimedia telephony service (MMTel)-voice-call-started message, an MO-MMTEL-video-call-started message, or an MO-SMSoIP-attempt-started message. In implementations where the access check operation is performed based on a bias value, the UE may set the RRC establishment cause based on the applicable type of the communication session, such as mo-voiceCall, mo-videoCall, or mo-SMS.

Additionally, the present disclosure describes systems for establishing an RRC connection. To illustrate, a UE may start a service, such as a response to paging from a first RAT, or an MO-MMTel-voice-call-started message, an MO-MM-TEL-video-call-started message, or an MO-SMSoIP-attempt-started message in the first RAT. Prior to the service being established in a connected state via the first RAT, the network, such as a core network, may perform an RRC release with redirection to a second RAT. A lower layer related to the second RAT may or may not perform an access check operation for a service request, such as a service request related to an RRC connection establishment request. To illustrate, in some implementations, the UE may bypass performance of the access check operation based on (or in response to) receipt of the RRC release. In implementations where performance of the access check operation is bypassed, the UE may set an RRC establishment cause to indicate an exempted service, such as mt-access. To further illustrate, in some implementations, the UE may perform the access check operation based on a bias value. The access check operation may be performed based (or in response to) receipt of the RRC release. In implementations where the access check operation is performed based on a bias value, the UE may set an RRC establishment cause based on the paging or the MO voice, MO video, or MO SMS. The UE may establish the RRC connection with the second RAT.

Particular implementations of the subject matter described in this disclosure can be implemented to realize one or more of the following potential advantages. For example, configuring the UE in this manner may improve establishment of an RRC connection. To illustrate, the operations of the UE described herein enable the UE to establish the RRC connection (with a base station or a RAT) such that odds of establishing the RRC connection may be increased. In situations where the UE is attempting to perform a handover operation for a service, the handover operation may be performed to improve a quality of service related to the service. In situations where the UE is attempting to establish a connection of a service with via a redirected RAT, the service may be established with via the redirected RAT in a reliable manner. Additionally, the UE may establish the RRC connection and improve quality of experience.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. Additionally, an operator network may include one or more LTE networks, or one or more other networks. The various different network types may use different RATs and RANs.

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes/km$^2$), ultra-low complexity (such as ~10s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps/km$^2$), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to one of ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device to device or peer to peer or ad hoc network arrangements, etc.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as a user equipment (UE) in standards and specifications promulgated by the 3rd Generation Partnership Project (3GPP), such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (such as MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100 A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is reported to the network through the small cell base station 105f. The 5G network 100 may provide additional network efficiency through dynamic, low-latency TDD/FDD communications, such as in a vehicle-to-vehicle (V2V) mesh network between the UEs 115i-115k communicating with the macro base station 105e.

Figure 2:
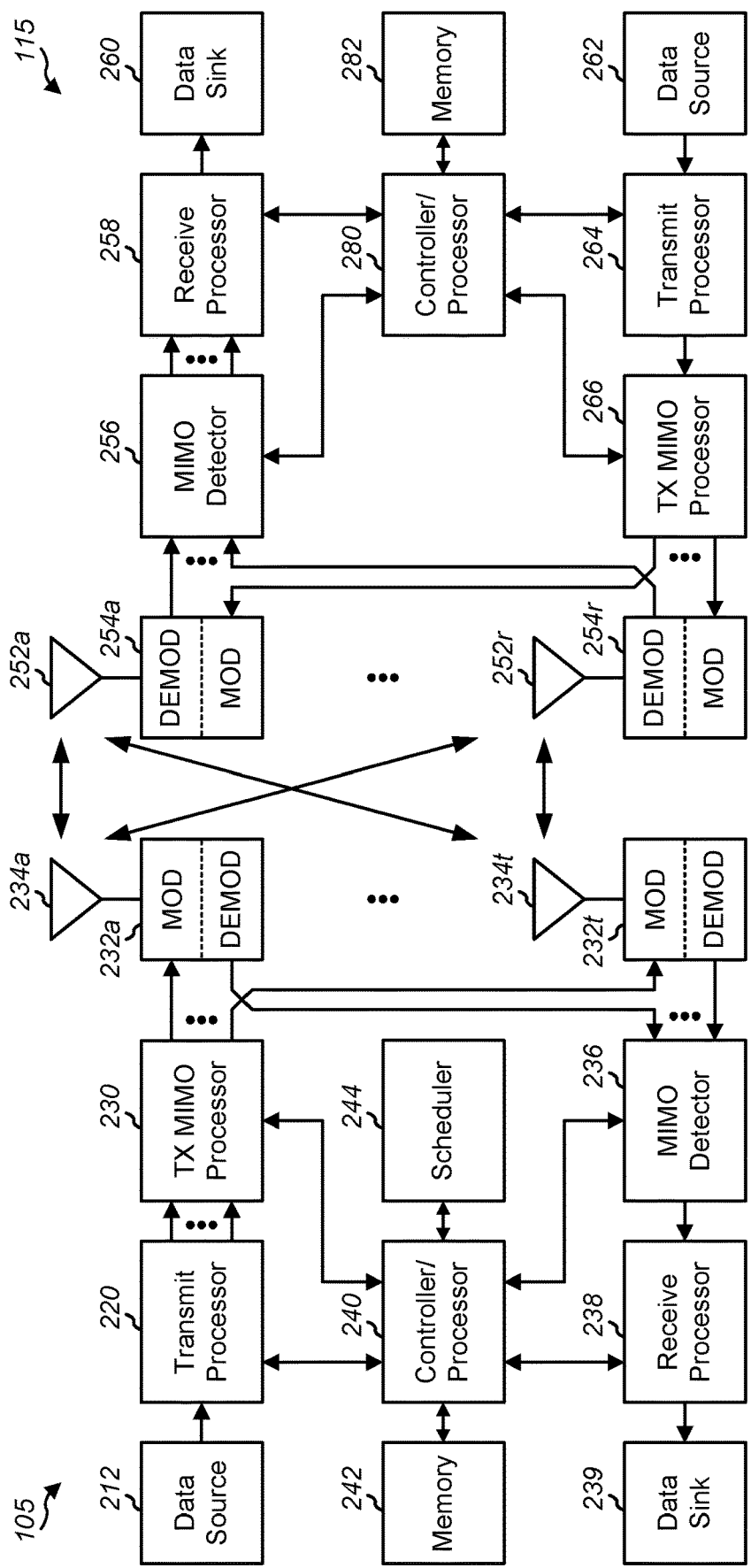
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) MIMO processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller/processor 280. For example, to process the detected symbols, receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller/processor 280. Additionally, transmit processor 264 may generate reference symbols for a reference signal. The symbols from the transmit processor 264 may be precoded by TX MIMO processor 266 if applicable, further processed by the modulators 254a through 254r (such as for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 or other processors and modules at base station 105 or controller/processor 280 or other processors and modules at UE 115 may perform or direct the execution of various processes for the techniques described herein, such as to perform or direct the execution illustrated in FIGS. 7-9, or other processes for the techniques described herein. Memories 242 and 282 may store data and program codes for base station 105 and UE 115, respectively. The scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
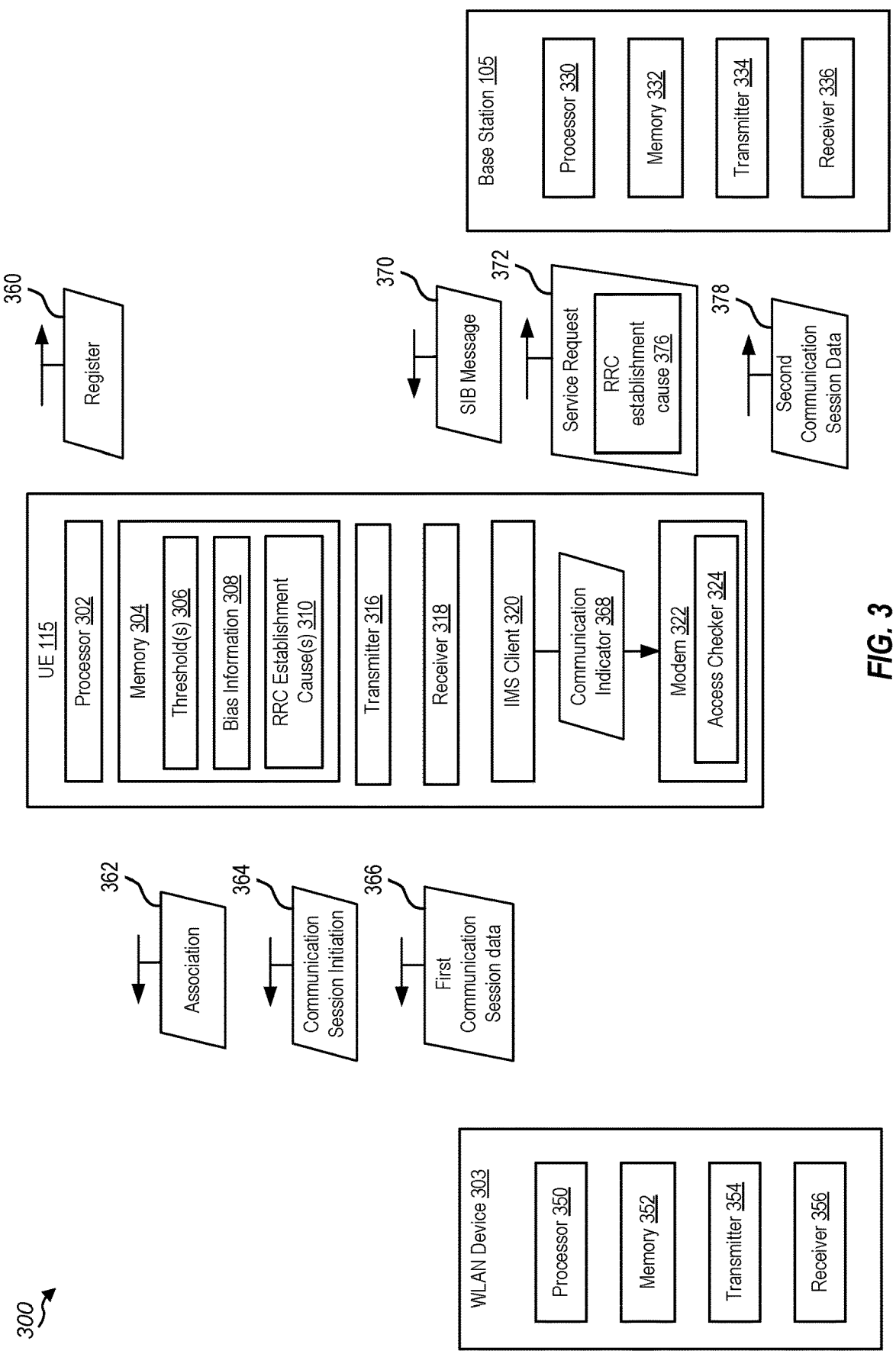
FIG. 3 is a block diagram of an example wireless communication system for performing a handover operation.

FIG. 3 is a block diagram of an example wireless communications system 300 for performing a handover operation. In some examples, the wireless communications system 300 may implement aspects of the wireless communication system 100. For example, wireless communications system 300 may include a UE 115 and a base station 105. Although one UE and one base station are illustrated, in some other implementations, the wireless communications system 300 may include multiple UEs 115, multiple base stations 105, or both.

The UE 115 includes a processor 302, a memory 304, a transmitter 316, a receiver 318, an internet protocol (IP) multimedia subsystem (IMS) client 320, and a modem 322. The processor 302 may be configured to execute instructions stored at the memory 304 to perform the operations described herein. In some implementations, the processor 302 includes or corresponds to the controller/processor 280, and the memory 304 includes or corresponds to the memory 282. In addition to the instructions stored at the memory 304, the memory 304 may be configured to store one or more thresholds 306, bias information 308, and one or more RRC establishment causes 310, as further described herein.

The one or more thresholds 306 may include one or more values used by the UE 115 during operation(s), such as an access check operation. For example, the UE 115 may receive a barring factor and may compare the barring factor to a threshold, such as a threshold having a value of 90 percent, 95 percent, or 100 percent, as illustrative, non-limiting examples.

The bias information 308 may include one or more bias values within a range of zero to one. In some implementations, the bias information 308 includes a plurality of bias values (or ranges of bias values) from which a bias value may be selected based on a service type, such as a voice service, a video service, or an SMS, as illustrative, non-limiting examples. To illustrate, the bias value may be determined based on a selection of the bias value from multiple bias values included in the bias information 308, and the selection may be based on a service type, as an illustrative, non-limiting example. Additionally, or alternatively, the bias value may be selected based on a RAN type, such as 3GPP, 4G, or 5G, as illustrative, non-limiting examples. In implementations where the RAN type is 4G, the bias value may further be selected based on an access call barring (ACB) operation or a service specific access control (SSAC) operation. The UE 115 may be configured to apply the bias value to a barring factor or a barring time, as described further herein at least with reference to FIG. 6.

The RRC establishment cause(s) 310 may include one or more causes, such as an exempted service, an mt-access, a voice session, a video session, an SMS session, or the like, as illustrative, non-limiting examples.

The transmitter 316 is configured to transmit data to one or more other devices, and the receiver 318 is configured to receive data from one or more other devices. For example, the transmitter 316 may transmit data, and the receiver 318 may receive data, via a network, such as a wired network, a wireless network, or a combination thereof. For example, the UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, the transmitter 316 and the receiver 318 may be replaced with a transceiver. Additionally, or alternatively, the transmitter 316, the receiver 318, or both may include or correspond to one or more components of the UE 115 described with reference to FIG. 2.

The IMS client 320 is configured to initiate a communication session, such as a wireless communication session, with the WLAN device 303. For example, the IMS client 320 may start a communication session with a cellular network via the WLAN device 303. To illustrate, the IMS client 320 may begin a communication with the WLAN device 303 such that the WLAN device 303 enables a connection of the UE 115 to a 4G core or a 5G core, as illustrative, non-limiting examples. The wireless communication session may include a voice communication session, a video communication session, an SMS communication session, or a combination thereof. Additionally, or alternatively, the wireless communication session may include a mobile originated session or a mobile terminated session started over WLAN. In some implementations, the IMS client 320 may send a communication indicator 368 to modem based on the communication session. For example, based on the communication session being established between the IMS client 320 and the WLAN device 303, the IMS client 320 may send, to the modem 322, an MO-MMTEL-voice-call-started message, an MO-MMTEL-video-call-started message, or an MO-SMSoIP-attempt-started message. Additionally, or alternatively, the IMS client 320 may determine to handover the communication session and send a handover request to the modem 322. For example, the IMS client 320 may determine to handover the communication session, with the cellular network via the WLAN device 303, from the WLAN device 303 to a cellular network, such as the same cellular network or a different cellular network. The same and different cellular networks may be deemed to be equivalent options. For example, the same cellular network may be associated with the same cellular operator and different cellular network may be associated with a different cellular operator that is considered an equivalent option to the currently used cellular network. Additionally, or alternatively, the handover operation may occur to the same core, such as 4G to 4G, or 5G to 5G, or across cores, 4G to 5G, or 5G to 4G.

The modem 322 is configured to perform an access check operation. To illustrate, modem includes access checker 324 configured to perform the access check operation. For example, the access check operation may include a unified access control check operation, such as a unified access control check operation related to 5G. As another example, the access check operation may include an ACB operation, an SSAC operation, or both. The ACB operation and the SSAC operation may be related to 4G. In some implementations, the modem 322 is configured to perform the access check operation based on a bias value, such as a bias value included in or determined based on the bias information 308. For example, the modem 322 may generate a modified barring factor based on the bias value, as described further herein at least with reference to FIG. 6. Additionally, or alternatively, the access check operation may be performed based on the communication indicator 368 related to a wireless communication session between the UE 115 and WLAN device 303. To perform the access check operation, the modem 322 may receive a system information block (SIB) message 370 from the base station 105. The SIB message 370 may include barring information, such as a barring factor or a barring time. In some implementations, the modem 322 may receive or generate a random number and compare the random number to the barring factor (or a modified barring factor generated based on a bias factor). Additionally, or alternatively, the modem 322 may compare the barring factor to a threshold or determine whether the barring factor indicates a particular value, such as 100 percent blocked. Based on a result of the comparison, the modem 322 may or may not initiate generation of the service request 372. For example, if the barring factor is determined to indicate 100 percent blocked, the bias value is set such that the modified barring factor is the same as the barring factor. In such situations, the service request 372 is not generated.

Additionally, in some implementations, the modem 322 may be configured to perform the access check operation, but may selectively skip performance of the access check operation. For example, the modem 322 may be configured to skip performance of the access check operation based on or in response to receiving the handover request from the IMS client 320. Alternatively, the modem 322 may be configured to perform the access check operation, but may selectively ignore or disregard a result of the access check operation.

In some implementations, the modem 322 is configured to establish an RRC connection with the base station 105. For example, the modem 322 may establish the RRC connection based on a result of the access check operation. To illustrate, based on a determination that the result of the access check operation indicated that a handover operation is not barred, the UE 115 may send the service request 372. To establish the RRC connection, the modem 322 may generate the service request 372. In some implementations, the modem 322 may include an RRC establishment cause 376 in a service request. For example, the modem 322 may select/set the RRC establishment cause 376 from the one or more RRC establishment causes 310. In some other implementations, the modem 322 may establish the RRC connection without performing an access check operation or independent of a result of the access check operation.

The base station 105 includes a processor 330, a memory 332, a transmitter 334, and a receiver 336. In some implementations, the base station 105 includes a cellular network device. The processor 330 may be configured to execute instructions stored at the memory 332 to perform the operations described herein. In some implementations, the processor 330 includes or corresponds to the controller/processor 240, and the memory 332 includes or corresponds to the memory 242.

The transmitter 334 is configured to transmit data to one or more other devices, and the receiver 336 is configured to receive data from one or more other devices. For example, the transmitter 334 may transmit data, and the receiver 336 may receive data, via a network, such as a wired network, a wireless network, or a combination thereof. For example, the base station 105 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, the transmitter 334 and the receiver 336 may be replaced with a transceiver. Additionally, or alternatively, the transmitter 334, the receiver, 336, or both may include or correspond to one or more components of the base station 105 described with reference to FIG. 2.

The WLAN device 303 includes a processor 350, a memory 352, a transmitter 354, and a receiver 356. In some implementations, the WLAN device 303 may include or correspond to an enhanced packet data gateway (ePDG) which connects to an Evolved Packet Core (EPC) or a Non-3GPP Inter-Working Function (N3IWF) which connects to a 5G Core network (5GC). The processor 350 may be configured to execute instructions stored at the memory 352 to perform the operations described herein.

The transmitter 354 is configured to transmit data to one or more other devices, and the receiver 356 is configured to receive data from one or more other devices. For example, the transmitter 354 may transmit data, and the receiver 356 may receive data, via a network, such as a wired network, a wireless network, or a combination thereof. For example, WLAN device 303 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, the transmitter 354 and the receiver 356 may be replaced with a transceiver.

During operation of the wireless communications system 300, the UE 115 sends one or more registration messages 360 to the base stations 105. Based on the one or more registration messages 360, the UE 115 may be registered with a RAN and core network. For example, the UE 115 may have a subscription with a service provider and may include (have stored therein) instructions/software for communicating with the RAN and core network.

The UE 115 may be within a communication range of the WLAN device 303 and send the one or more association messages 362 to the WLAN device 303. For example, the UE 115 may perform an association/authentication exchange with the WLAN device 303.

The UE 115 sends a communication session initiation message 364 to the WLAN device 303 to establish a communication session. For example, the UE 115 may determine that a wireless connection with the WLAN device 303 is better than a wireless connection with base station 105 and may establish a voice call session via the WLAN device 303. To illustrate, the UE 115 may establish a communication session, such as a voice call session, via the WLAN device 303 to connect to the cellular network EPC or 5GC. As part of the communication session established via the WLAN device 303, the UE 115 sends first communication session data 366, such as voice data, to the WLAN device 303.

During the communication session, the UE 115 may generate the communication indicator 368 and provide the communication indicator 368 to the modem 322. For example, the communication indicator 368 may be sent to the modem 322 in response to establishment of the wireless communication session between the UE and the WLAN device or in response to a determination to perform the handoff of the communication session. Based on or in response to receiving the communication indicator 368, the modem 322 may determine whether to perform the access check operation.

The UE 115 may receive an SIB message 370 from the base station 105. The SIB message 370 may include barring information, such as a barring factor, a barring time, or both. The UE 115 may use the barring information to perform the access check operation.

In some implementations, the UE 115 may send the service request 372 to the base station 105 and may establish an RRC connection with the base station 105. To illustrate, the UE 115 may establish, independent of performance of an access check operation or independent of a result of an access check operation, the RRC connection with the base station 105. For example, to establish the RRC connection independent of the access check operation, the UE 115 may set the RRC establishment cause 376 as an exempted service. In some implementations, the UE 115 may establish the RRC connection with the base station 105 based on a result of the access check operation. In such implementations, the UE 115 may set the RRC establishment cause 376 to indicate the UE 115 is involved in the communication session.

Based on establishment of the RRC connection, a handover operation is performed to transfer the wireless communication session from the WLAN device 303 to the base station 105. For example, the handover operation may be performed to transfer the wireless communication session form the WLAN device 303 to the base station 105 within the same core cellular network. After the handover operation is complete, the UE 115 continues the communication session via the base station 105 and sends second communication session data 378 (of the communication session) to the base station 105.

Figure 4:
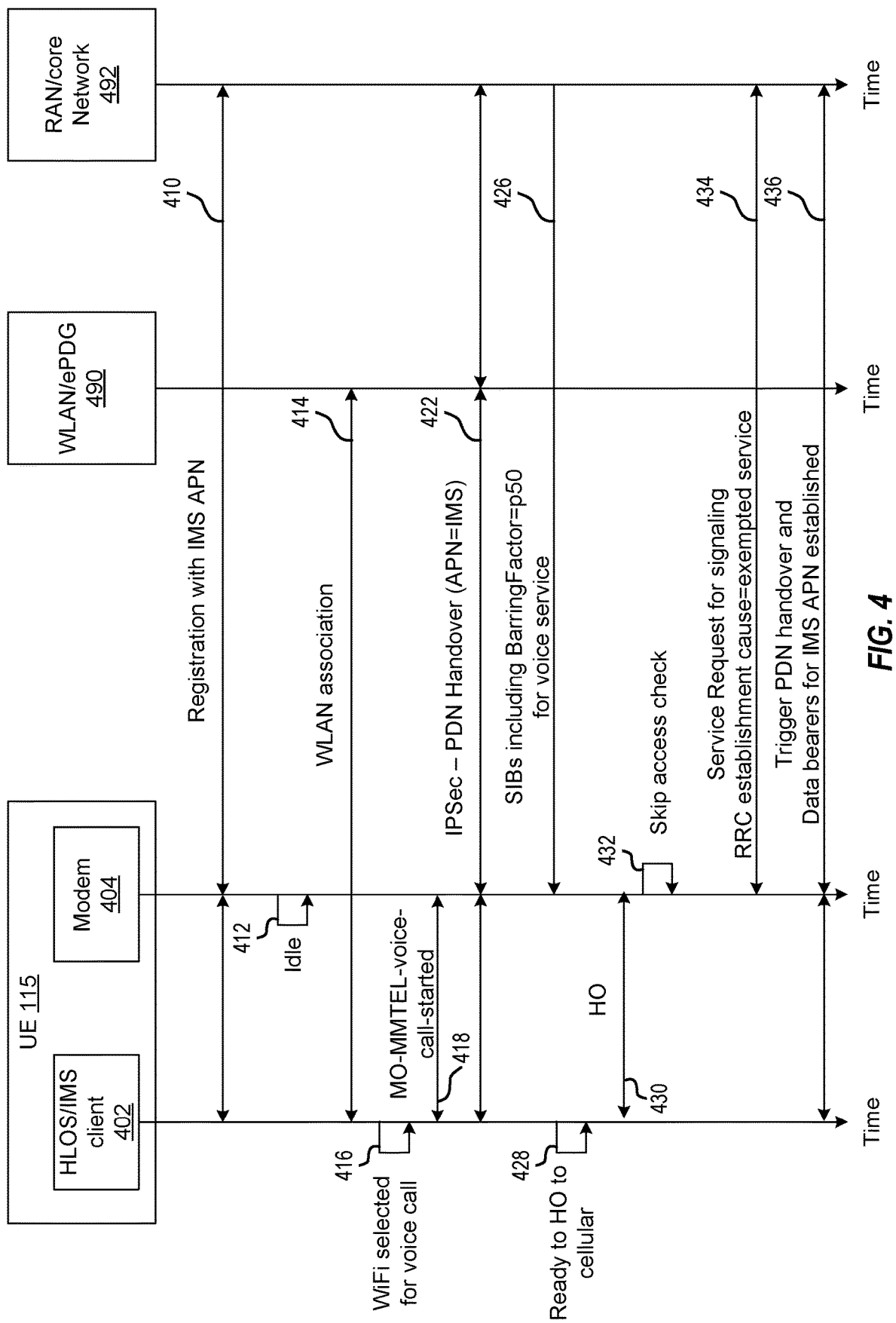
FIG. 4 is a ladder diagram of an example wireless communication system for performing a handover operation.

In some implementations, the UE 115 may bypass performance of the access check operation based on (or in response to) the modem 322 receiving the communication indicator 368, such as a handover request, as described further herein at least with reference to FIG. 4. In implementations where performance of the access check operation is bypassed, the UE 115 may set the RRC establishment cause 376 to an exempted service. Alternatively, the UE 115 may perform the access check operation but may disregard a result of the access check operation based on the modem 322 receiving the communication indicator 368, such as the handover request. In implementations where performance of the access check operation is disregarded, the UE 115 may set the RRC establishment cause 376 to an exempted service. In some implementations, the UE 115 may perform the access check operation based on a bias value, as described further herein at least with reference to FIG. 5. The access check operation may be performed based (or in response to) on modem 322 receiving the communication indicator 368, such as an MO-MMTEL-voice-call-started message, an MO-MMTEL-video-call-started message, or an MO-SM-SoIP-attempt-started message. In implementations where the access check operation is performed based on a bias value, the UE 115 may set the RRC establishment cause 376 based on the applicable type of the communication session, such as mo-voiceCall, mo-videoCall, or mo-SMS.

Although operations of the UE 115 have been described with reference to FIG. 3 as transferring a communication of the UE 115 from the WLAN device 303 to the base station 105, operations of the UE 115 described herein may be applicable in other scenarios to enable the UE 115 to establish an RRC connection with the base station 105. For example, operations described herein with reference to the UE 115 may be used, based on the UE 115 receiving an RRC release with respect to a first base station (or first RAN), to enable the UE 115 to establish an RRC connection with a second base station (or second RAN). The first base station and the second base station may be the same base station or different base stations.

To illustrate, the UE 115 may start a service, such as in response to paging from a first RAT, or MO voice, MO video, or MO SMS in the first RAT. Prior to the service being established in a connected state, the network, such as a core network, may perform an RRC release with redirection to a second RAT. A lower layer related to the second RAT may or may not perform an access check operation for a service request, such as the service request 372 related to an RRC connection establishment request, to start the service or establish the service in a connected state via the second RAT. To illustrate, in some implementations, the UE 115 may bypass performance of the access check operation based on (or in response to) receipt of the RRC release. In implementations where performance of the access check operation is bypassed, the UE 115 may set the RRC establishment cause 376 to an exempted service. To further illustrate, in some implementations, the UE 115 may perform the access check operation based on a bias value. The access check operation may be performed based (or in response to) receipt of the RRC release. In implementations where the access check operation is performed based on a bias value, the UE 115 may set the RRC establishment cause 376 based on the paging or the MO voice, MO video, or MO SMS.

In some implementations, an apparatus, such as the UE 115, is configured for wireless communication. The apparatus includes at least one processor 302 and the memory 304 coupled to the at least one processor 302. The at least one processor 302 is configured to generate, by the UE 115, a handover request related to a wireless communication session between the UE 115 and the WLAN device 303. The at least one processor 302 is further configured to initiate, by the UE 115 and independent of an access check, establishment of an RRC connection with the base station 105.

In some implementations, an apparatus, such as the UE 115, is configured for wireless communication. The apparatus includes at least one processor 302 and the memory 304 coupled to the at least one processor 302. The at least one processor 302 is configured to perform, by the UE 115, an access check based on a bias value, such as a bias value determined based on the bias information 308. The access check is performed based on the communication indicator 368 related to a wireless communication session between the UE 115 and the WLAN device 303. The at least one processor 302 is further configured to initiate, by the UE 115, establishment of an RRC connection with the base station 105 based on a result of the access check.

In some implementations, the UE 115 may begin an MO-MMTEL voice call over WLAN when the UE 115 is out of 3GPP access coverage. For example, the UE 115 may use ePDG or N3IWF to begin the call. In some implementations, the UE 115 may begin the MO-MINITEL voice call over WLAN because the signal quality for 3GPP access is determined by the UE 115 to be below a threshold, or because 3GPP access is barred. If 3GPP access conditions improve, the UE 115 may request a handover of an ongoing voice call from WLAN to 3GPP. To illustrate, the IMS client 320 may send an MO-MMTEL-voice-call-started indication when the call is started over WLAN. Alternatively, the IMS client 320 may delay sending an MO-MMTEL-voice-call-started indication for a period of time before triggering the handover procedure to 3GPP access. In this case, a unified access control (UAC) check may not be performed. For example, the IMS client may send the indication to a 5G mobility management (5GMM) entity associated with the non-access stratum (NAS) layer. Although described with reference to an MO-MINITEL voice call, similar or the same operations may be performed to handover to other services, such as MO-MINITEL video call or SMS. For example, a handover of ongoing MMTEL voice, MMTEL video or SMS from non-3GPP to 3GPP access may be related to an access category=mt-access, which is exempted from an access check.

In some implementations, during a handover of an ongoing MINITEL voice, MINITEL video session from non-3GPP to 3GPP access, the UE 115 (such as an IMS multimedia telephony communication service) may send a handover request of the ongoing service from the non-3GPP access and an MMTEL started indication to the NAS layer. The NAS layer is a functional layer in a UMTS, LTE, or NR protocal stack. The indication allows the NAS layer to bypass the UAC check (or a SSAC check) for handover request of an ongoing MINITEL voice, MINITEL video session or SMS session from non-3GPP to 3GPP access. To illustrate, if only audio, only real-time text, or only both audio and real-time text are used in the multimedia telephony communication session, the UE 115 may send the MO-MINITEL-voice-started indication and a handover indication of ongoing MINITEL voice call from non-3GPP access to the NAS in order to handover an ongoing multimedia telephony communication session from non-3GPP access to 3GPP access. The UE 115 may send the MO-MINITEL-voice-started indication at the beginning of the voice call over WLAN access or any time before sending the indication of handover of an ongoing MINITEL voice call from non-3GPP access. Alternatively, if video is used in the multimedia telephony communication session, the UE 115 may send the MO-MMTEL-video-started indication and the handover indication of ongoing MINITEL video call from non-3GPP access to the NAS in order to handover an ongoing multimedia telephony communication session from non-3GPP access to 3GPP access.

In some implementations, during handover of an ongoing SMS over IP network from non-3GPP to 3GPP access, the UE 115 (such as an SMS service) sends a handover request of an ongoing service from non-3GPP access and an MINITEL started indication to the NAS layer. The indication allows the NAS layer to bypass UAC check for handover of the ongoing SMS over IP network from non-3GPP to 3GPP access. As an example, when an ongoing SMS service over IP network is handed over from non-3GPP access to 3GPP access, the UE 115 may send the MO-SMSoIP-attempt-started indication and a handover of ongoing SMSoIP from non-3GPP access indication to the NAS.

Thus, FIG. 3 describes a system, such as 300, for enabling the UE 115 to improve establishment of an RRC connection. To illustrate, the operations of the UE 115 described herein enable the UE 115 to establish the RRC connection (with a base station or a RAT) such that odds of establishing the RRC connection are increased. In situations where the UE 115 is attempting to perform a handover operation for a service, the handover operation may be performed to improve a quality of service related to the service. In situations where the UE 115 is attempting to establish a connection of a service via a redirected RAT, the service may be established via the redirected RAT in a reliable manner. Additionally, the UE may establish the RRC connection and improve a quality of experience.

Figure 5:
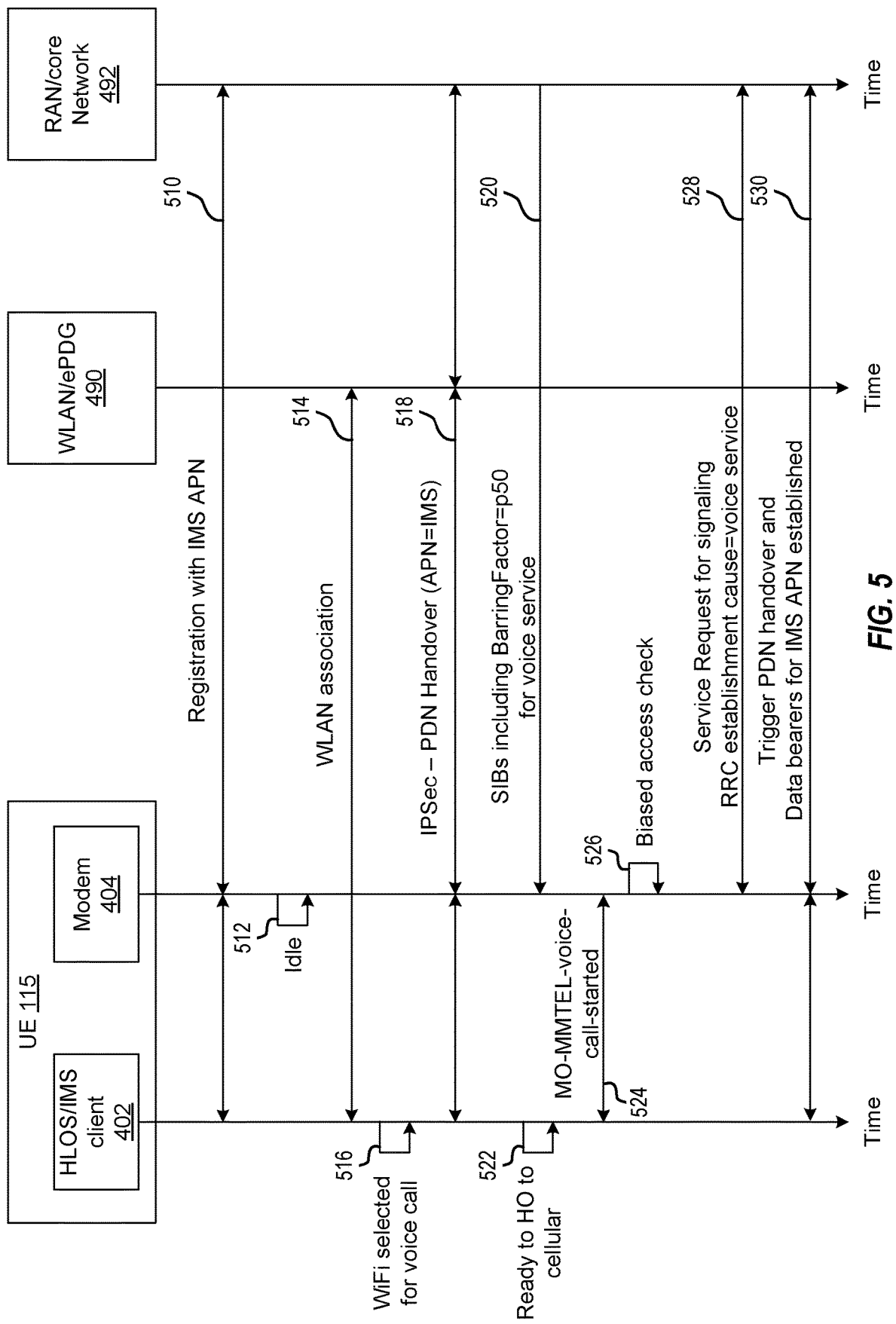
FIG. 5 is a ladder diagram of another example wireless communication system for performing a handover operation.

Referring to FIGS. 4 and 5, FIG. 4 is a ladder diagram of an example wireless communication system for performing a handover operation, and FIG. 5 is a ladder diagram of another example wireless communication system for performing a handover operation. FIGS. 4 and 5 include the UE 115, a WLAN/ePDG 490 and an RAN/core network 492. The WLAN/ePDG 490 and the RAN/core network 492 may include or correspond to the WLAN device 303 and the base station 105, respectively. As shown, the UE 115 includes a high level operating system (HLOS)/IMS client 402 and modem 404. The HLOS/IMS client 402 and the modem 404 may include or correspond to the IMS client 320 and the modem 322, respectively. As shown in FIGS. 4 and 5, a handover of a voice call is shown; however, this is for ease of understanding and it is understood that FIGS. 4 and 5 also may be applicable to handovers of video and SMS. For example, the handover may be related to a wireless communication session, such as a mobile originated (MO) session or a mobile terminated (MT) session, each of which may be started via WLAN.

Referring to FIG. 4, during operation, at 410, the UE 115, such as the modem 404, registers IMS access point name (APN) with the RAN/core network 492. For example, the RAN/core network 492 may support/provide 3GPP. At 412, the UE 115 is idle. At 414, the UE 115 performs WLAN association with the WLAN/ePDG 490.

At 416, the UE 115 determines to establish a voice call and selects wireless fidelity (WiFi). At 418, the HLOS/IMS client 402 provides a communication indicator, such as MO-MMTEL-voice call-started.

At 422, IP security (IPSec)-packet data network (PDN) Handover for APN=IMS is communicated between the UE

115, the WLAN/ePDG 490 and the RAN/core network 492. At 426, the RAN/core network 492 provides an SIB including a barring factor of 50 percent (p50) for voice service to modem 404.

At 428, the HLOS/IMS client 402 determines to handover the voice call to a cellular network, such as a cellular network related to the RAN/core network 492. At 430, the HLOS/IMS client 402 sends a handover (HO) request to the modem 404.

At 432, the modem 404 skips performance of an access check operation. At 434, the modem 404 sends, to the RAN/core network 492, a service request for signaling with the RRC establishment cause set to indicate an exempted service. At 436, a PDN handover is triggered and data bearers for IMS APN are established to enable handover of the voice call from the WLAN/ePDG 490 to the RAN/core network 492.

Although FIG. 4 is described with reference to 3GPP, the techniques described herein are also applicable to 4G and 5G. In 5G, the modem 404 may map the service request at 528 to an exempted service from access check such as access category=mt-access and set the RRC establishment cause as mt-access. In 4G, the modem 404 may skip ACB, SSAC, or both, and check and continue as if the service request is in response to network paging.

Referring to FIG. 5, during operation, at 510, the UE 115, such as the modem 404, registers IMS APN with the RAN/core network 492. At 512, the UE 115 is idle.

At 514, the UE 115 performs WLAN association with the WLAN/ePDG 490. At 516, the UE 115 determines to establish a voice call and selects WiFi.

At 518, IPSec-PDN Handover for APN=IMS is communicated between the UE 115, the WLAN/ePDG 490 and the RAN/core network 492. At 520, the RAN/core network 492 provides an SIB including a barring factor of 50 percent (p50) for voice service to the modem 404.

At 522, the HLOS/IMS client 402 determines to handover voice call to a cellular network, such as a cellular network related to the RAN/core network 492. At 524, the HLOS/IMS client 402 provides a communication indicator, such as MO-MMTEL-voice call-started.

At 526, the modem 404 performs a biased access check. At 528, the modem 404 sends, to the RAN/core network 492, a service request for signaling with an RRC establishment cause set to an applicable type of the communication session, such as mo-voiceCall, mo-videoCall, or mo-SMS. At 530, a PDN handover is triggered and data bearers for IMS APN are established to enable handover of the voice call from the WLAN/ePDG 490 to the RAN/core network 492.

Although FIG. 5 is described with reference to 3GPP, the techniques described herein are also applicable to 4G and 5G. For 4G and 5G, the UE 115 can define several values depending on RAN specific usage such as: bias5G, bias4G_ACB, bias4G_SSAC, etc.

Thus, each of FIGS. 4 and 5 provide improved quality of experience (QoE) in which successful handover of a WLAN voice call is achieved. Additionally, with respect to FIG. 5, the UE 115 may avoid contributing to severely congested RAN resources where the possibility of stable voice call over cellular is not good, such as when a barring factor is equal to 100 percent (p100).

Figure 6:
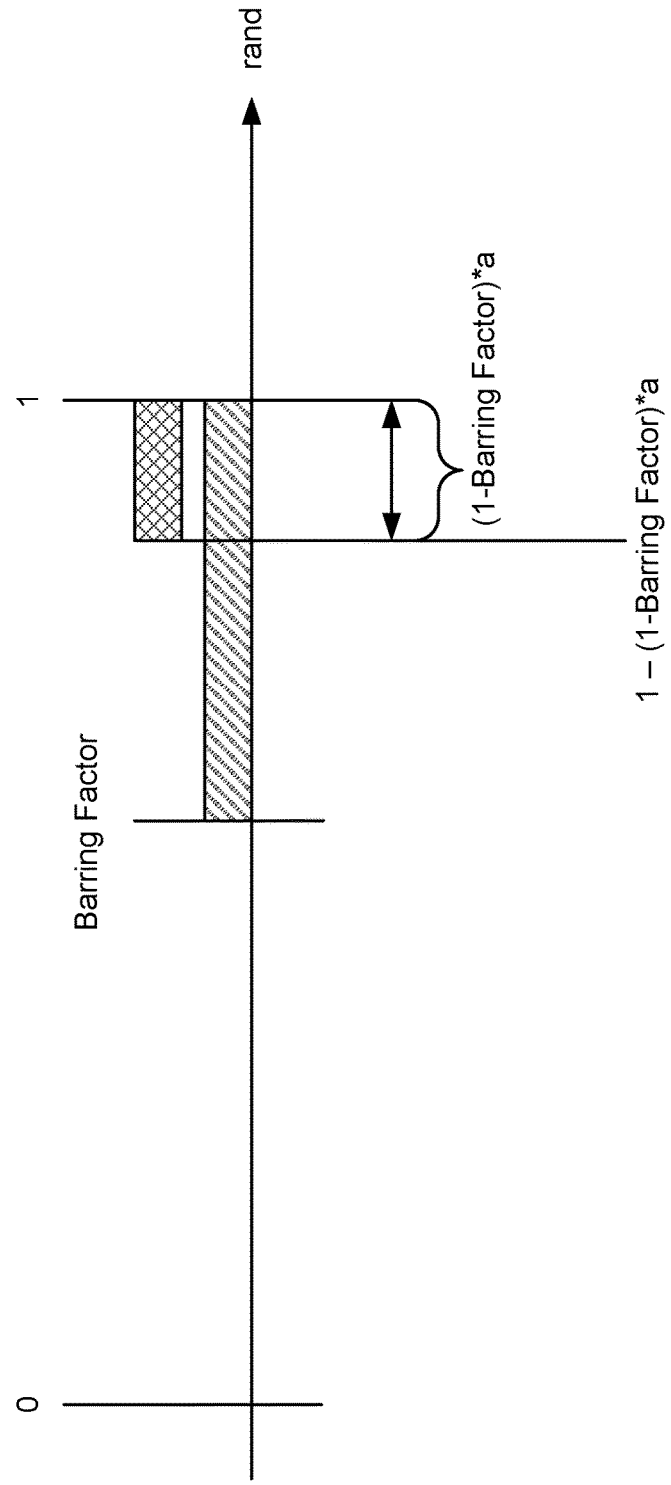
FIG. 6 is a diagram to illustrate an example of an access check operation based on a bias value.

FIG. 6 is an example of an access check operation based on a bias value. As shown, a barring factor may be defined for a category, such as a communication category. To illustrate, the communication category may include a voice category, a video category, or an SMS category. The biasing factor may be represented as a percentage and may correspond to a value between [0, 1].

To perform the access check operation, the UE 115 may determine a bias factor "a", also referred to as a scaling factor or a scale down factor. In some implementations, the bias factor may be determined, such as calculated or selected, based on the communication category. In some implementations, the bias factor "a" may be set to 100 percent (which may correspond to a value of 1), which may correspond to no bias. For example, UE may set the bias factor "a" to 100 percent based on a determination that the barring factor is greater than or equal to a threshold. For example, the threshold may be determined or selected based on the communication category. The threshold may include a value between [0, 1], such as 0.5, 0.78, 0.8, 0.9, 0.95, 1, as illustrative, non-limiting examples.

The UE 115 may determine a random number "rand: between [0,1]." The UE 115 may determine that a communication session is barred from a handover operation (or to perform RRC release with redirection is barred) if: rand≥1−(1−BarringFactor)*a. It is noted that "1−(1−BarringFactor) *a" may correspond to a biased barring region that is less than an original barring region. Alternatively, if: rand <1−(1−BarringFactor)*a, the UE 115 may determine that a communication session is permitted for a handover operation (or to perform an RRC release with redirection is permitted).

Figure 10:
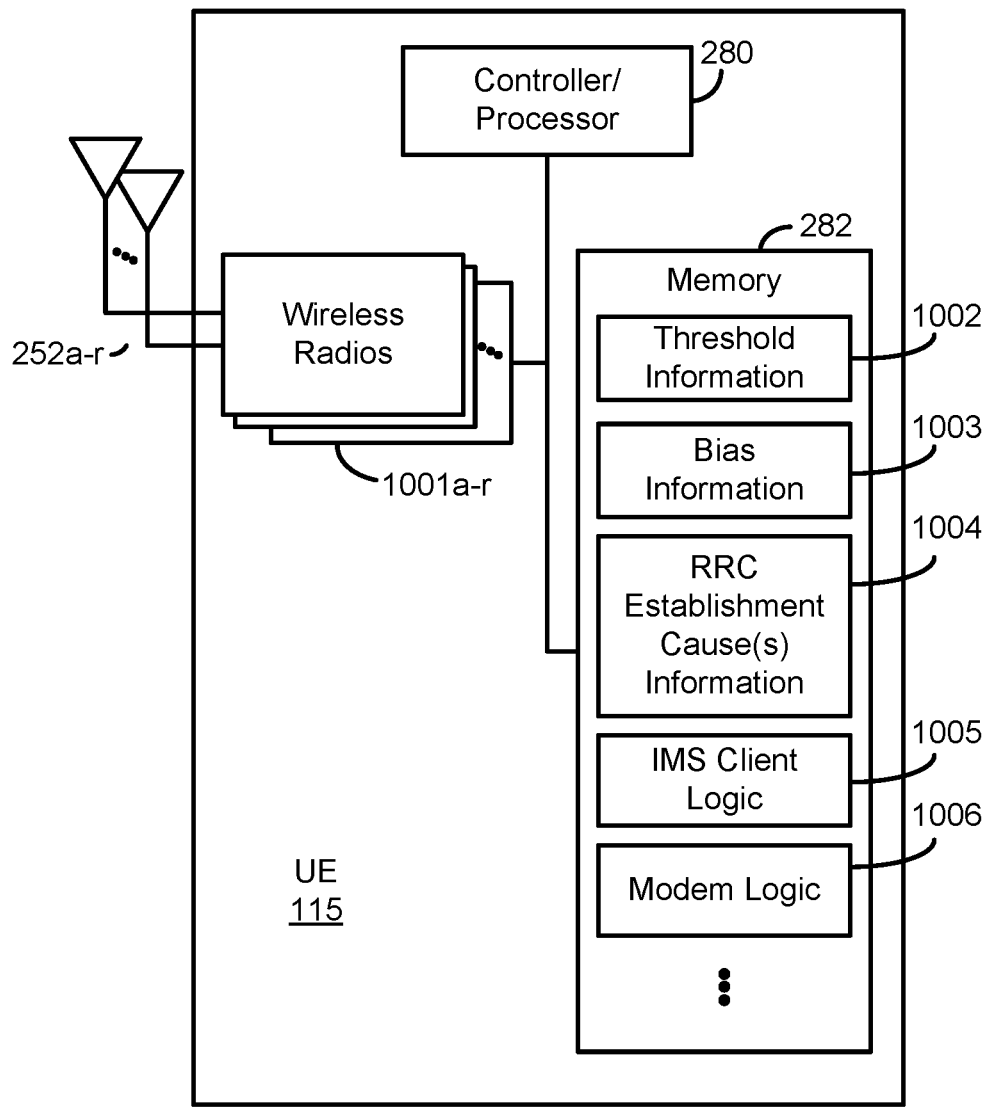
FIG. 10 is a block diagram conceptually illustrating an example design of a UE.

FIGS. 7-9 are block diagrams illustrating example blocks executed by a UE. The example blocks will also be described with respect to the UE 115 as illustrated in FIG. 10. FIG. 10 is a block diagram illustrating the UE 115 configured according to one aspect of the present disclosure. The UE 115 includes the structure, hardware, and components as illustrated for the UE 115 of FIG. 2 or 3. For example, the UE 115 includes the controller/processor 280, which operates to execute logic or computer instructions stored in the memory 282, as well as controlling the components of the UE 115 that provide the features and functionality of the UE 115. The UE 115, under control of the controller/processor 280, transmits and receives signals via the wireless radios 1001a-r and the antennas 252a-r. The wireless radios 1001a-r includes various components and hardware, as illustrated in FIG. 2 for the UE 115, including the modulator/demodulators 254a-r, the MIMO detector 256, the receive processor 258, the transmit processor 264, and the TX MIMO processor 266.

As shown, the memory 282 may include threshold information 1002, bias information 1003, RRC establishment cause(s) information 1004, IMS client logic 1005, and modem logic 1006. The threshold information 1002, the bias information 1003, the RRC establishment cause(s) information 1004 may include or correspond to the one or more threshold 306, the bias information 308, and the one or more RRC establishment causes 310, respectively. The IMS client logic 1005 may include or correspond to the IMS client 320. The modem logic 1006 may include or correspond to the modem 322. In some aspects, the IMS client logic 1005, the modem logic 1006, or a combination thereof, may include or correspond to processor(s) 280. The UE 115 may receive signals from or transmit signal to a base station, such as the base station 105 or the RAN/core network 492, or to a WLAN device, such as the WLAN device 303 or the WLAN/ePDG 490.

Referring to FIG. 7, at block 700, the UE generates a handover request related to a wireless communication session between the UE and a WLAN device. For example, the wireless communication session may include a mobile originated (MO) session or a mobile terminated (MT) session. In some implementations, the wireless communication session may include a voice communication session, a video communication session, an SMS communication session, or a combination thereof.

At block 701, the UE establishes, independent of an access check, an RRC connection with a base station. In some implementations, the base station includes a cellular network device.

In some implementations, a block may be included in which the UE establishes the wireless communication session with the WLAN device. Additionally, or alternatively, a block may be included in which the UE performs a handover operation to transfer the wireless communication session from the WLAN device to the base station.

In some implementations, a block may be included in which an IMS client of the UE sends a communication indicator to a modem of the UE. For example, the communication indicator may include or correspond to the communication indicator 368. The IMS client and the modem may include or correspond to the IMS client logic 1005 and the modem logic 1006, respectively. The communication indicator may be sent from the IMS to the modem in response to establishment of the wireless communication session between the UE and the WLAN device. The communication indicator may include an MO-MMTEL-voice-call-started message, an MO-MMTEL-video-call-started message, or an MO-SMSoIP-attempt-started message, as illustrative, non-limiting examples.

In some implementations, a block may be included in which the IMS client determines to handover the communication session. In some such implementations, the IMS client sends the handover request to the modem. The access check may be performed by the modem. To illustrate, the access check may be performed in response to the modem receiving the handover request. The access check may include a unified access control check operation. Alternatively, the access check may include an ACB operation, an SSAC operation, or both.

In some implementations, a block may be included in which the modem of the UE receives an SIB from the base station. The SIB may include a barring factor, a barring time, or both. The barring factor may indicate an amount of blockage, such as 50 percent blocked, 75 percent blocked, or 100 percent blocked, as illustrative, non-limiting examples.

In some implementation, a block may be included in which the modem sets an RRC establishment cause as an exempted service. To illustrate, mode may set the RRC establishment cause based on the RRC establishment causes information 1004. In some such implementations, the modem transmits a service request that includes the RRC establishment cause to the base station. In some other implementations, the modem skips performance of the access check operation based on receiving the handover request.

Referring to FIG. 8, at block 800, the UE performs an access check based on a bias value, the access check performed based on a communication indicator related to a wireless communication session between the UE and a WLAN device. The wireless communication session includes a voice communication session, a video communication session, an SMS communication session, or a combination thereof.

At block 801, the UE establishes an RRC connection with a base station based on a result of the access check. In some implementations, the base station includes a cellular network device.

In some implementations, a block may be included in which the UE establishes the wireless communication session with the WLAN device. Additionally, or alternatively, a block may be included in which the UE performs a handover operation to transfer the wireless communication session from the WLAN device to the base station.

In some implementations, a block may be included in which an IMS client of the UE determines to perform a handoff of the communication session. The IMS client may include or correspond to the IMS client logic 1005. In some implementations, a block may be included in which the IMS client sends the communication indicator to a modem of the UE. The modem may include or correspond to the modem logic 1006. For example, the communication indicator may be sent from the IMS to the modem in response to a determination to perform the handoff of the communication session. The communication indicator may include an MO-MMTEL-voice-call-started message, an MO-MMTEL-video-call-started message, or an MO-SMSoIP-attempt-started message, as illustrative, non-limiting examples. The access check may be performed by the modem in response to receiving the communication indicator from the IMS client. In some implementations, the access check operation includes a unified access control check operation.

In some implementations, a block may be included in which the modem receives an SIB from the base station. For example, the SIB may include an SIB message, such as the SIB message 370. The SIB includes a barring factor, a barring time, or both. The barring factor may indicate an amount of blockage, such as 50 percent blocked, 75 percent blocked, or 100 percent blocked, as illustrative, non-limiting examples. In some implementations, a block may be included in which the modem determines the bias value. The bias value may include or correspond to the bias information 1003. Additionally, or alternatively, a block may be included in which the modem modifies the barring factor based on the bias value. The access check may be performed by the modem using the modified barring factor.

In some implementations, the bias value may be included within a range of values, such as a range of zero to one. To determine the bias value, the bias value may be selected from multiple value based on a service type, such as a type selected from the group consisting of a voice service, a video service, and an SMS. In some such implementations, a block may be included in which the UE identifies the type of the communication session.

In some implementations, a block may be included in which the modem determines whether the barring factor indicates 100 percent blocked. If the barring factor is determined to indicate 100 percent blocked, the bias value may be set such that the modified barring factor is the same as the barring factor. In some implementations, the bias value is selected based on an RAN type. For example, the RAN type may include 3GPP, 4G, or 5G. In implementations where the RAN type is 4G, the bias value also may be selected based on an ACB operation or an SSAC operation.

Referring to FIG. 9, at block 900, the UE initiates a service in a first RAT. At block 901, the UE receives an RRC release message prior to establishment of the service in a connected state, the RRC release message including redirection to a second RAT. At block 902, the UE determines whether to perform an access check operation to establish an RRC connection via the second RAT.

In some implementations, a block may be included in which the UE receives a paging from the first RAT. In some such implementations, a block may be included in which the UE initiates the service at the first RAT in response to receiving the paging.

In some implementations, a block may be included in which the UE initiates the service at the first RAT. In some such implementations, the service may be related to a mobile originating an MO-MMTel-voice-call-started message, an MO-MMTEL-video-call-started message, or an MO-SM-SoIP-attempt-started message in the first RAT.

In some implementations, the UE establishes the RRC connection and communicates, related to the service, via the second RAT.

In some implementations, a block may be included in which the UE establishes, independent of an access check, the RRC connection with the second RAT. In some implementations, the UE may determine not to perform the access check operation. For example, the UE may skip performance of the access check operation based on receiving the RRC release message. In some implementations, a block may be included in which UE sets an RRC establishment cause as an exempted service.

In some implementations, the UE determines to perform the access check operation. For example, the access check operation may be performed by a modem of the UE. The access check my be performed in response to receiving the RRC release message. The access check operation may include a unified access control check operation. In some implementations, a block may be included in which UE sets an RRC establishment cause as an exempted service. As another example, after the UE determines to perform the access check operation, the UE may perform the access check operation based on a bias value and based on (or in response to) the RRC release message. In some implementations, the RRC connection is established with the second RAT based on a result of the access check operation.

In some implementations, a block may be included in which the UE receives an SIB. The SIB may include a barring factor, a barring time, or both. For example, the barring factor indicates 100 percent blocked.

In some implementations, a block may be included in which the UE determines the bias value, and modifies the barring factor based on the bias value. In such implementations, the access check may be performed using the modified barring factor. Determining the bias value includes selecting the bias value from multiple value based on a service type. The service type may include a type selected from the group consisting of a voice service, a video service, and an SMS. Additionally, or alternatively, the bias value may be selected based on an RAN type. For example, the RAN type may include 3GPP, 4G, or 5G. When the RAN type is 4G, the bias value may further be selected based on an ACB operation or an S SAC operation. In some implementations, a block may be included in which the UE determines whether the barring factor indicates 100 percent blocked. If the barring factor is determined to indicate 100 percent blocked, the bias value is set such that the modified barring factor is the same as the barring factor.

It is noted that one or more blocks (or operations) described with reference to FIGS. 7-9 may be combined with one or more blocks (or operations) of another of figure. For example, one or more blocks of FIGS. 7-9 may be combined with one or more blocks (or operations) of another of FIG. 2,3, or 10. Additionally, or alternatively, one or more operations described above with reference to FIGS. 1-6 may be combine with one or more operations described with reference to FIGS. 7-9.

In some aspects, techniques for supporting a handover operation may include additional aspects, such as any single aspect or any combination of aspects described below or in connection with one or more other processes or devices described elsewhere herein. In some aspects, supporting a handover operation may include an apparatus configured to generate a handover request related to a wireless communication session between the apparatus and a WLAN device. The apparatus is further configured to establish, independent of an access check, an RRC connection with a base station. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a first aspect, the apparatus is further configured to establish the wireless communication session with the WLAN device.

In a second aspect, alone or in combination with the first aspect, the apparatus is further configured to performing a handover operation to transfer the wireless communication session from the WLAN device to the base station.

In a third aspect, alone or in combination with one or more of the first through second aspects, the wireless communication session includes a voice communication session, a video communication session, an SMS communication session, or a combination thereof.

In a fourth aspect, alone or in combination with one or more of the first through third aspects, the base station includes a cellular network device.

In a fifth aspect, alone or in combination with one or more of the first through fourth aspects, the apparatus is further configured to send, by an IP IMS client, a communication indicator to a modem of the apparatus.

In a sixth aspect, in combination with the fifth aspect, the communication indicator is sent from the IMS to the modem in response to establishment of the wireless communication session between the apparatus and the WLAN device.

In a seventh aspect, in combination with the sixth aspect, the communication indicator includes an MO-MMTel-voice-call-started message, an MO-MMTEL-video-call-started message, or an MO-SMSoIP-attempt-started message.

In an eighth aspect, alone or in combination with one or more of the first through seventh aspects, the apparatus is further configured to determine, by the IMS client, to handover the communication session.

In a ninth aspect, in combination with the eighth aspect, the apparatus is further configured to send, by the IMS client, the handover request to the modem.

In a tenth aspect, in combination with the ninth aspect, the access check is performed by the modem.

In an eleventh aspect, alone or in combination with one or more of the first through tenth aspects, the apparatus is further configured to receive, by the modem, an SIB from the base station.

In a twelfth aspect, in combination with the eleventh aspect, the SIB includes a barring factor, a barring time, or both.

In a thirteenth aspect, in combination with the twelfth aspect, the barring factor indicates 100 percent blocked.

In a fourteenth aspect, alone or in combination with one or more of the first through thirteenth aspects, the access check includes a unified access control check operation, the access check includes an ACB operation, or an SSAC operation.

In a fifteenth aspect, in combination with the fourteenth aspect, the apparatus is further configured to set, by the modem, an RRC establishment cause as an exempted service.

In a sixteenth aspect, in combination with the fifteenth aspect, the apparatus is further configured to transmit, by the modem, a service request that includes the RRC establishment cause to the base station.

In a seventeenth aspect, alone or in combination with one or more of the first through sixteenth aspects, the wireless communication session includes a mobile originated session or a mobile terminated session.

In an eighteenth aspect, alone or in combination with one or more of the first through seventeenth aspects, the apparatus is further configured to skip, by the modem, performance of the access check based on receiving the handover request.

In some aspects, an apparatus configured for wireless communication, such as a UE, is configured to perform an access check based on a bias value. The access check is performed based on a communication indicator related to a wireless communication session between the apparatus and a WLAN device. The apparatus is further configured to establish an RRC connection with a base station based on a result of the access check. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a nineteenth aspect, the apparatus is further configured to establish the wireless communication session with the WLAN device.

In a twentieth aspect, alone or in combination with the nineteenth aspect, the apparatus is further configured to perform a handover operation to transfer the wireless communication session from the WLAN device to the base station.

In a twenty-first aspect, alone or in combination with one or more of the nineteenth through twentieth aspects, the wireless communication session includes a voice communication session, a video communication session, an SMS communication session, or a combination thereof.

In a twenty-second aspect, alone or in combination with one or more of the nineteenth through twenty-first aspects, the base station includes a cellular network device.

In a twenty-third aspect, alone or in combination with one or more of the nineteenth through twenty-second aspects, the apparatus is further configured to determine, by an IP IMS client, to perform a handoff of the communication session.

In a twenty-fourth aspect, alone or in combination with one or more of the nineteenth through twenty-third aspects, the apparatus is further configured to send, by the IMS client, the communication indicator to a modem of the apparatus.

In a twenty-fifth aspect, in combination with the twenty-fourth aspect, the communication indicator is sent from the IMS to the modem in response to a determination to perform the handoff of the communication session.

In a twenty-sixth aspect, in combination with the twenty-fifth aspect, the communication indicator includes an MO-MMTel-voice-call-started message, an MO-MMTEL-video-call-started message, or an MO-SMSoIP-attempt-started message.

In a twenty-seventh aspect, alone or in combination with one or more of the nineteenth through twenty-sixth aspects, the access check is performed by the modem in response to receiving the communication indicator from the IMS client.

In a twenty-eighth aspect, alone or in combination with one or more of the nineteenth through twenty-seventh aspects, the apparatus is further configured to receive, by the modem, an SIB from the base station.

In a twenty-ninth aspect, in combination with the twenty-eighth aspect, the SIB includes a barring factor, a barring time, or both.

In a thirtieth aspect, in combination with the twenty-ninth aspect, the barring factor indicates 100 percent blocked.

In a thirty-first aspect, alone or in combination with one or more of the nineteenth through thirtieth aspects, the access check includes a unified access control check operation.

In a thirty-second aspect, alone or in combination with one or more of the nineteenth through thirty-first aspects, the apparatus is further configured to determine, by the modem, the bias value.

In a thirty-third aspect, in combination with the thirty-second aspect, modifying, by the modem of the apparatus, the barring factor based on the bias value.

In a thirty-fourth aspect, in combination with the thirty-third aspect, the access check is performed by the modem using the modified barring factor.

In a thirty-fifth aspect, in combination with the thirty-fourth aspect, the bias value is included within a range of zero to one.

In a thirty-sixth aspect, in combination with one or more of the thirty-fourth through thirty-fifth aspects, to determine the bias value, the apparatus if further configured to select the bias value from multiple value based on a service type.

In a thirty-seventh aspect, in combination with the thirty-sixth aspect, the service type includes a type selected from the group consisting of a voice service, a video service, and an SMS.

In a thirty-eighth aspect, alone or in combination with one or more of the nineteenth through thirty-seventh aspects, the apparatus is further configured to determine, by the modem, whether the barring factor indicates 100 percent blocked.

In a thirty-ninth aspect, in combination with the thirty-eighth aspect, if the barring factor is determined to indicate 100 percent blocked, the bias value is set such that the modified barring factor is the same as the barring factor.

In a fortieth aspect, alone or in combination with one or more of the nineteenth through thirty-seventh aspects, the bias value is selected based on a RAN type.

In a forty-first aspect, in combination with the fortieth aspect, the RAN type includes 3GPP, 4G, or 5G.

In a forty-second aspect, in combination with the forty-first aspect, when the RAN type is 4G, the bias value is further selected based on an ACB operation or an S SAC operation.

In some aspects, an apparatus configured for wireless communication, such as a UE, is configured to initiate a service in a first RAT. The apparatus is further configured receive an RRC release message prior to establishment of the service in a connected state. The RRC release message includes redirection to a second RAT. The apparatus is further configured determine whether to perform an access check operation to establish an RRC connection via the second RAT. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a forty-third aspect, the apparatus is further configured to establish, independent of an access check, the RRC connection with the second RAT.

In a forty-fourth aspect, alone or in combination with the forty-third aspect, the access check is performed by a modem of the apparatus.

In a forty-fifth aspect, alone or in combination with one or more of the forty-third through forty-fourth aspects, the apparatus is further configured to set an RRC establishment cause as an exempt access.

In a forty-sixth aspect, alone or in combination with the forty-third aspect, the apparatus is further configured to skip performance of the access check based on receipt of the RRC release message.

In a forty-seventh aspect, the apparatus is further configured to perform the access check based on a bias value, and the access check performed based on the RRC release message.

In a forty-eighth aspect, in combination with the forty-seventh aspect, the apparatus is further configured to establish the RRC connection with the second RAT based on a result of the access check.

In a forty-ninth aspect, in combination with the forty-eighth aspect, the access check is performed in response to receiving the RRC release message.

In a fiftieth aspect, alone or in combination with one or more of the forty-third through forty-ninth aspects, the apparatus is further configured to receive n SIB.

In a fifty-first aspect, in combination with the fiftieth aspect, the SIB includes a barring factor, a barring time, or both.

In a fifty-second aspect, in combination with the fifty-first aspect, the barring factor indicates 100 percent blocked.

In a fifty-third aspect, alone or in combination with one or more of the forty-third through fifty-second aspects, the access check includes a unified access control check operation.

In a fifty-fourth aspect, in combination with one or more of the forty-eighth through fifty-third aspects, the apparatus is further configured to determine the bias value.

In a fifty-fifth aspect, in combination with the fifty-fourth aspect, the apparatus is further configured to modify the barring factor based on the bias value.

In a fifty-sixth aspect, in combination with the fifty-fifth aspect, the access check is performed by the modem using the modified barring factor.

In a fifty-seventh aspect, in combination with the first through fifty-sixth aspect, to determine the bias value, the apparatus if further configured to select the bias value from multiple value based on a service type.

In a fifty-eighth aspect, in combination with the fifty-seventh aspect, the service type includes a type selected from the group consisting of a voice service, a video service, and an SMS.

In a fifty-ninth aspect, in combination with one or more of the fifty-first through fifty-eighth aspects, the apparatus is further configured to determine whether the barring factor indicates 100 percent blocked.

In a sixtieth aspect, in combination with the fifty-ninth aspect, if the barring factor is determined to indicate 100 percent blocked, the bias value is set such that the modified barring factor is the same as the barring factor.

In a sixty-first aspect, alone or in combination with one or more of the forty-third through fifty-eighth aspects, the bias value is selected based on a RAN type.

In a sixty-second aspect, in combination with the sixty-first aspect, the RAN type includes 3GPP, 4G, or 5G.

In a sixty-third aspect, in combination with the sixty-second aspect, when the RAN type is 4G, the bias value is further selected based on an ACB operation or an S SAC operation.

In a sixty-fourth aspect, alone or in combination with one or more of the forty-third through sixty-third aspects, the apparatus is further configured to receive a paging from the first RAT.

In a sixty-fifth aspect, in combination with the sixty-fourth aspect, the apparatus is further configured to initiate the service at the first RAT in response to receiving the paging.

In a sixty-sixth aspect, alone or in combination with one or more of the forty-third through sixty-third aspects, the apparatus is further configured to initiate the service at the first RAT.

In a sixty-seventh aspect, in combination with the sixty-sixth aspect, the service is related to a mobile originating an MO-MMTel-voice-call-started message, an MO-MMTEL-video-call-started message, or an MO-SMSoIP-attempt-started message in the first RAT.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein (such as components of FIG. 3, functional blocks of FIGS. 7-9, and modules in FIG. 2) may include processors, electronics devices, hardware devices, electronics components, logical circuits, memories, software codes, firmware codes, etc., or any combination thereof. In addition, features discussed herein relating to components, the functional blocks, and the modules described herein (such as components of FIG. 3, functional blocks of FIGS. 7-9, and modules in FIG. 2) may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
generating, by a user equipment (UE), a handover request related to a wireless communication session between the UE and a wireless local area network (WLAN) device;
sending, by an internet protocol (IP) multimedia subsystem (IMS) client of the UE, a communication indicator to a modem of the UE; and
establishing, by the UE and independent of an access check, a radio resource control (RRC) connection with a base station.

2. The method of claim 1, further comprising:
establishing, by the UE, the wireless communication session with the WLAN device, wherein the base station includes a cellular network device; and
performing, by the UE, a handover operation to transfer the wireless communication session from the WLAN device to the base station, wherein the wireless communication session includes a voice communication session, a video communication session, a short message service (SMS) communication session, or a combination thereof.

3. The method of claim 1, wherein:
the communication indicator is sent from the IMS to the modem in response to establishment of the wireless communication session between the UE and the WLAN device; and
the communication indicator includes a mobile originating (MO)-multimedia telephony service (MMTel)-voice-call-started message, an MO-MMTEL-video-call-started message, or an MO-SMSoIP-attempt-started message.

4. The method of claim 1, further comprising:
determining, by the IMS client of the UE, to handover the wireless communication session; and
sending, by the IMS client of the UE, the handover request to the modem; and
wherein the access check is performed by the modem.

5. The method of claim 1, further comprising:
setting, by the modem of the UE, an RRC establishment cause as an exempted service; and
transmitting, by the modem of the UE, a service request that includes the RRC establishment cause to the base station.

6. The method of claim 1, wherein the access check comprises a unified access control check operation, or a service specific access control (SSAC) operation.

7. The method of claim 6, further comprising bypassing, by the modem of the UE, performance of the access check based on receipt, by the modem, of the handover request from the IP IMS client of the UE.

8. The method of claim 1, wherein the wireless communication session includes a mobile originated (MO) session or a mobile terminated (MT) session.

9. The method of claim 1, further comprising receiving, by the modem of the UE, the communication indicator, wherein the modem is configured to bypass the access check in response to receipt of the communication indicator.

10. The method of claim 1, further comprising bypassing, by the UE, performance of the access check based on receipt, by the modem, of the communication indicator.

11. The method of claim 1, further comprising:
determining, by the UE, not to performance the access check in response to receipt, by the modem, of the communication indicator; and
setting, by the UE, an RRC establishment cause to indicate an exempted service.

12. The method of claim 1, further comprising bypassing, by the UE, performance of the access check based on receipt, by the UE, of an RRC release.

13. An apparatus configured for wireless communication, comprising:
at least one processor; and
a memory coupled to the at least one processor,
wherein the at least one processor is configured to:
generate, by a user equipment (UE), a handover request related to a wireless communication session between the UE and a wireless local area network (WLAN) device;
send, by an internet protocol (IP) multimedia subsystem (IMS) client of the UE, a communication indicator to a modem of the UE; and
initiate, by the UE and independent of an access check, establishment of a radio resource control (RRC) connection with a base station.

14. The apparatus of claim 13, wherein the at least one processor is further configured to initiate, by the UE, establishment of the wireless communication session with the WLAN device.

15. The apparatus of claim 13, wherein the at least one processor is further configured to perform, by the UE, a handover operation to transfer the wireless communication session from the WLAN device to the base station.

16. The apparatus of claim 13, wherein the wireless communication session includes a voice communication session, a video communication session, a short message service (SMS) communication session, or a combination thereof.

17. The apparatus of claim 13, wherein the base station includes a cellular network device.

18. The apparatus of claim 13, wherein the communication indicator includes an MO-MMTEL-voice-call-started message, an MO-MMTEL-video-call-started message, or an MO-SMSoIP-attempt-started.

19. The apparatus of claim 13, wherein the at least one processor is further configured to:
 determine, by the IMS client of the UE, to handover the wireless communication session; and
 send, by the IMS client of the UE, the handover request to the modem; and
 wherein the access check is performed by the modem.

20. The apparatus of claim 13, wherein the at least one processor is further configured to:
 set, by the modem of the UE, an RRC establishment cause as an exempted service; and
 initiate, by the modem of the UE, transmission of a service request that includes the RRC establishment cause to the base station.

21. The apparatus of claim 13, wherein the at least one processor is further configured to avoid performance of the access check, by a modem of the UE, based on receipt, by the modem, of the handover request.

22. The apparatus of claim 13, wherein the access check comprises a unified access control check operation, a service specific access control (SSAC) operation, or both.

23. An apparatus configured for wireless communication, comprising:
 means for generating, by a user equipment (UE), a handover request related to a wireless communication session between the UE and a wireless local area network (WLAN) device;
 means for sending a communication indicator to a modem of the UE; and
 means for establishing, by the UE and independent of an access check, a radio resource control (RRC) connection with a base station.

24. The apparatus of claim 23, further comprising means for establishing, by the UE, the wireless communication session with the WLAN device.

25. The apparatus of claim 24, further comprising means for performing, by the UE, a handover operation to transfer the wireless communication session from the WLAN device to the base station.

26. A non-transitory, computer-readable medium storing instructions that, when executed by a processor, cause the processor to perform operations comprising:
 generating, by a user equipment (UE), a handover request related to a wireless communication session between the UE and a wireless local area network (WLAN) device;
 sending, by an internet protocol (IP) multimedia subsystem (IMS) client of the UE, a communication indicator to a modem of the UE; and
 initiating, by the UE and independent of an access check, establishment of a radio resource control (RRC) connection with a base station.

27. The non-transitory, computer-readable medium of claim 26, wherein the wireless communication session includes a voice communication session, a video communication session, a short message service (SMS) communication session, or a combination thereof.

28. The non-transitory, computer-readable medium of claim 26, wherein the base station includes a cellular network device.

29. The non-transitory, computer-readable medium of claim 26, wherein the operations further comprise initiating, by the UE, establishment of the wireless communication session with the WLAN device.

30. The non-transitory, computer-readable medium of claim 29, wherein the operations further comprise performing, by the UE, a handover operation to transfer the wireless communication session from the WLAN device to the base station.

* * * * *